Patented Jan. 27, 1948

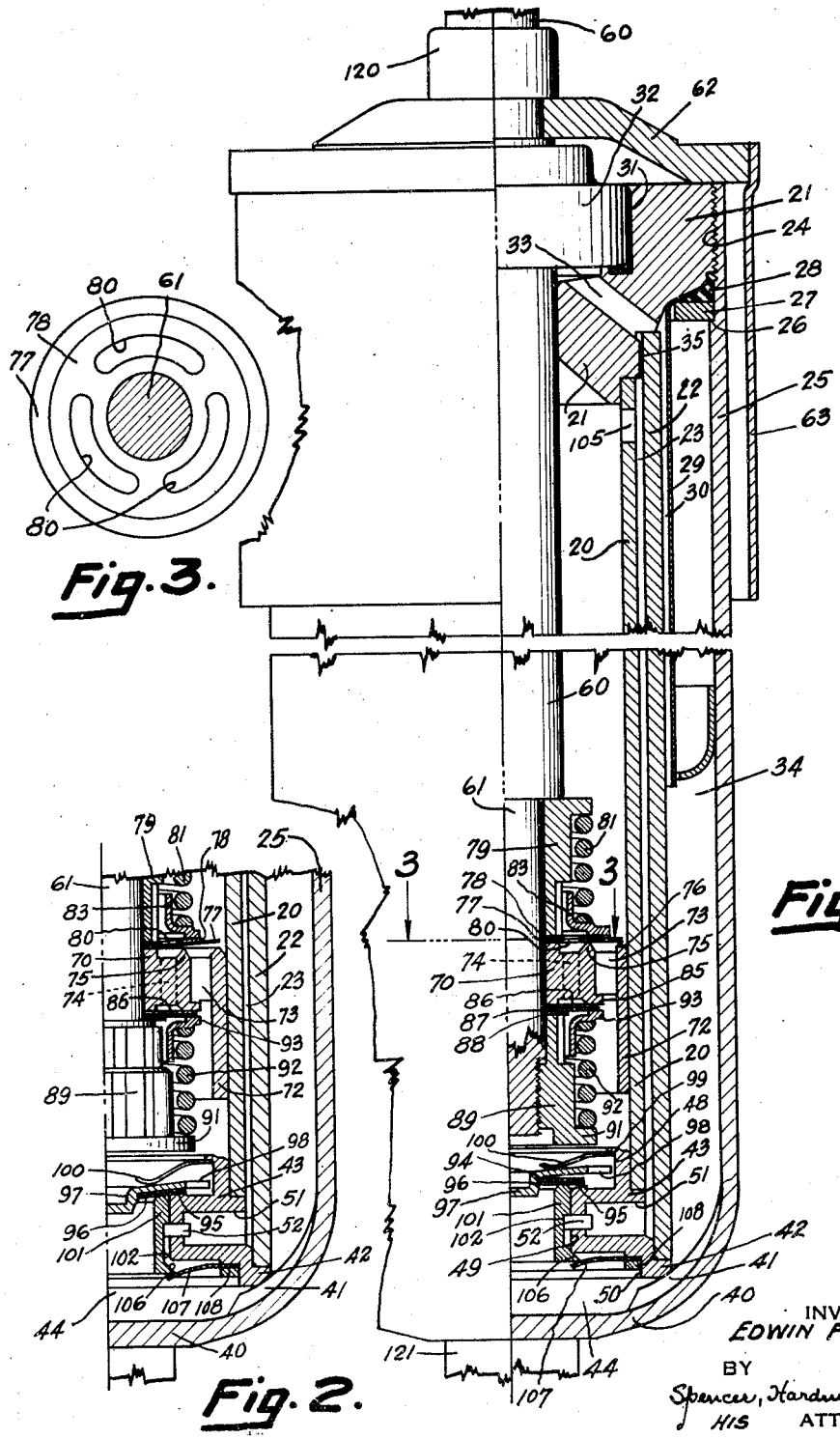

2,435,160

UNITED STATES PATENT OFFICE 2,435,160

DIRECT-ACTING HYDRAULIC SHOCK ABSORBER

Edwin F. Rossman, Dayton, Ohio, assignor to General Motors Corporation, Detroit, Mich., a corporation of Delaware Application April 10, 1946, Serial No. 660,995

10 Claims. (Cl. 188—88)

This invention relates to improvements in hydraulic shock absorbers and particularly to that type known as direct acting shock absorbers.

It is among the objects of the present invention to provide a direct acting shock absorber of simple and sturdy structure and design capable of constantly controlling the operating movements of two relatively movable members.

A still further object is to provide a shock absorber in which all control valves, which provide for restricted fluid flows, are carried by the piston thereby concentrating all restricted fluid flow through the piston.

Further objects and advantages of the present invention will be apparent from the following description, reference being had to the accompanying drawings wherein a preferred embodiment of the present invention is clearly shown.

In the drawings:

Fig. 1 is a longitudinal view of the shock absorber, fully collapsed, the right half being shown in section and the left half in elevation.

Fig. 2 is a fragmentary part-sectional view of the valve mechanism of the shock absorber in a position differing however from that shown in Fig. 1.

Fig. 3 is a detail view taken along the line 3—3 of Fig. 1.

Referring to the drawings, the shock absorber is shown comprising a cylinder 20. At the one or upper end of this cylinder there is provided a closure or head member 21 one portion thereof being turned down so as to fit snugly within the end of the cylinder 20. Another portion of this head member 21, of larger diameter than the portion fitting into the cylinder, fits into one end of the tube 22 which tube surrounds the cylinder 20 and is held concentrically therewith by the closure member 21 thereby providing an annular space 23 around the cylinder. The largest diameter portion of the closure member 21 is exteriorly threaded as at 24, this threaded portion of the closure member being received by the interiorly threaded, bored end of the casing tube 25. The bored end of the casing tube 25 provides a shoulder 26 upon which an abutment ring 27 rests, this abutment ring engaging a sealing gasket 28 and urging said sealing gasket into engagement with the closure member 21 when said closure member is secured into the threaded end of the casing tube 25. An intermediate tube 29 surrounds the tube 22 providing a narrow annular space 30 between the tube 22 and the tube 29. This tube 29 has an outwardly extending flange which fits between the packing gland 28 and the closure member 21 and thus is held rigidly in position when the closure member is screwed downwardly into the tube 25.

The closure member 21 has a central recess 31 which receives a bearing 32. The space in the closure member 21 beneath said bearing 32 is in communication with the space 30 by means of a series of passages one of which is designated by the numeral 33. As shown in Fig. 1 space 30 opens into the reservoir 34 which is the space between the tube 22 and the casing tube 25. Minute grooves 35 are provided in the surface of the closure member 21 fitting into the tube 22, these minute grooves providing communication between the space 23 and the passage 33 for purposes of permitting the escape of air in space 23 or within the cylinder 20.

The end of the casing tube 25 opposite the end threaded to closure member 21 is completely closed as at 40, the interior of said casing having spaced ribs 41 providing abutments upon which the outwardly extending flange 42 of a valve cage 43 rests. Thus, by the provision of these spaced ribs 41 within the casing 25, spaces are provided which form communication between the reservoir 34 and the space 44 beneath the valve cage. This valve cage has an annular portion adjacent the flange 42 about which one end of tube 22 tightly fits. Another reduced diameter portion of the valve cage 43 fits tightly into the one end of cylinder 20 so that these ends of the cylinder 20 and tube 22 are held in the same relative positions as are the ends which engage the closure member 21. The valve cage 43 is recessed as at 48 to form a cup portion within the cylinder 20. A central opening 49 in the cage extends from the bottom of the recess 48 to the bottom of a similar recess 50 in the opposite side of the valve cage or more specifically in the side of the valve cage adjacent the space 44 in the casing. This valve cage has an annular groove 51 provided in its peripheral surface which is substantially equal in diameter to the outside diameter of the cylinder 20. This annular groove 51 is in communication with the annular surface of the central opening 49 by slots 52. Valve cage 43 carries fluid flow controlling devices which will be described detailedly hereinafter.

A rod 60 extends from the outside of the shock absorber through the bearing 32 and is slidably supported in a central opening in the closure member 21, said rod extending into the cylinder and having a reduced diameter portion 61 upon which is mounted the piston 70 of the shock absorber. On the outside of the shock absorber, rod 60 has a dish-shaped disc 62 secured thereto in any suitable manner, this dish-shaped disc 62 having the dust cover or guard tube 63 secured thereto which guard surrounds the casing 25 for a portion of its length when the disc 62 on the piston rod rests upon the closure member 21 as shown in Fig. 1.

The piston of the shock absorber is designated by the numeral 70. It comprises a body portion having a depending annular skirt portion 72 which slidably engages the inner wall of the cylinder 20. The body portion of the piston has two sets of through passages each arranged in a circular row. The outer set arranged in a circular row of greater diameter is designated by the numeral 73 while the inner set arranged in a circular row of smaller diameter is designated by the numeral 74. On the one side of the piston an annular rib 75 provides a valve seat between the openings of the passages 73 and 74. Another larger diameter annular ridge 76, adjacent the outer peripheral surface of the piston and on the same side of the piston as ridge 75, provides a valve seat about the openings 73. These two valve seats 75 and 76 are engaged by a flexible disc-valve 77 upon which another disc 78 is superposed, both of these discs being centrally apertured to fit about the reduced diameter portion 61 and are clamped between the piston and an abutment collar 79 on the piston rod portion 61. Both sides 77 and 78 have series of elongated apertures 80 which align with the passages 74 in the piston. These slots are clearly shown in the detail plan view of Fig. 3. Discs 77 and 78 are of a flexible material and normally rest upon the annular ridges 75 and 76 on the upper side of the piston. They are urged into seating engagement with these ridges 75 and 76 by a coil spring 81 interposed between abutment collar 79 provided on the piston rod 61 and a flanged sleeve 83 the outer edge of the flange of said sleeve resting upon the disc 78. Thus the disc valve 77 is urged upon its annular seats 75 and 76 under spring load which must be overcome in order to flex the disc valve 77 sufficiently to move it from its seats and open communication between the passages 73 in the piston and the cylinder chamber above the said piston 70.

On the side of the piston body 71 opposite the valve 77 there is provided an annular valve seat 85 which surrounds the open ends of the passages 74 terminating in this side of the piston. A disc valve 86 reinforced by superposed resilient discs 87 and 88 has a central opening like its reinforcing discs which fit about the reduced diameter portion 61 of the piston rod 60. A pressure nut 89 threaded to the piston rod portion 61 presses against the disc 88 to push discs 88, 87 and 86 properly clamped between the nut and the bottom surface of the piston. In fact nut 89 clamps the entire assembly including the piston and its valves rigidly in position on the piston rod 60. Nut 89 has an outwardly extending flange 91 forming an abutment for one end of spring 92, the opposite end of said spring engaging the outwardly extending flange 93 of a sleeve which is urged against disc 87 by seat spring 92 thereby causing the resilient disc-valve 86 to be urged upon its seat 85 provided on the bottom surface of the piston outside the confines of the passages 74 in said piston. From the foregoing it may be seen that passages 73 in the piston are constantly open at their bottom ends but are shut off from communication with the upper part of the cylinder above the piston by the spring loaded disc-valve 77. Likewise, passages 74 are in constant communication with the portion of the cylinder above the piston due to the slot openings 80 in the discs 77 and 78. However, the opposite ends of said passages 74, terminating in the bottom side of the piston, are shut off from communication with the cylinder chamber beneath the piston by the spring loaded disc-valve 86.

The bottom of the recess 48 in the valve cage 43 provides an annular valve seat 95 which is normally engaged by the peripheral edge of the disc-valve 96 which is reinforced by a resilient disc 94, both centrally apertured and centrally secured to the valve carrier disc 97. Disc 97 has fluid passage notches 98 in its outer edge. It fits into the cage 43 so as to be movable axially thereof. A resilient ring shaped member 99 is secured in the valve cage and provides a plurality of inwardly extending radial finger springs 100 which engage the valve carrier disc 97 and yieldably urges it to maintain the disc valve 96 so that its edge normally engages the valve seat 95 and thereby normally closes communication between the lower cylinder chamber and the reservoir 34.

A second valve 101 is supported in the valve, this second valve being of the balanced sleeve type and slidably fitting within the central opening 49 in the valve cage. An annular groove 102 in the surface of the ring valve 101 engaging the annular surface of opening 49 provides an annular space which is in communication with notches or slots 52 leading from the annular groove 51 of the valve cage 43. As shown in Fig. 1 this annular groove 51 is always in communication with space 23 between the cylinder 20 and the tube 22. This space 23 is also in constant communication with the cylinder chamber directly beneath the head or closure member 21, by means of openings 105 in the cylinder 20. An outwardly flaring surface 106 on sleeve-valve 101 engages the lower annular edge formed on the valve cage 43 by the central opening 49, this portion 106 of valve 101 being maintained in contact with this annular edge by a blade spring 107 whose outer annular edge is secured to the valve cage by a clamping ring 108. While the sleeve-valve 101 is held in engagement with its seat on the valve cage 43, the inner end of said valve 101 is simultaneously urged against the disc-valve 96. When, however, said disc valve 96 is moved from its seat, as will be described hereinafter, it will move away from and no longer be engaged by the sleeve valve 101. However, this will not affect the position of the sleeve valve 101 as its outwardly flared portion 106 still engages the annular seat on the valve cage 43 and thus it cannot move inwardly any further under the effect of the spring 107. Neither can valve 101 move in response to any fluid pressure being directly exerted thereupon for valve 101 is of the balanced type. If any fluid pressure exists in the space 23 and consequently in the annular groove 51 and slots 52 of the valve cage, said fluid pressure will be exerted equally in all directions in the annular groove 102 of the sleeve valve 101 and therefore, being balanced, no movement of said sleeve valve will obtain as a result of these fluid pressures being exerted thereupon. The only way valve 101 may be moved is mechanically, by the movement of disc valve 96 toward and into tighter engagement with its valve-seat than is caused by the spring fingers 100. Such tighter engagement is effected only by fluid pressure acting upon the valve carrier plate or disc 97 as the piston moves downwardly to exert a pressure upon the fluid between the piston and valve cage 43. This phenomenon will detailedly be set forth in connection with the description of operation of the shock absorber.

The present shock absorber is adapted to be connected between two relatively movable members whose separating movements it is desired to control. Particularly the shock absorbers of this type are connected between the frame and axles of a motor vehicle to control their action while the motor vehicle is being operated. The cap disc 62 to which the piston rod 60 is attached has an anchoring member 120 provided thereon which, when the shock absorber is mounted on a vehicle is secured to the frame of the vehicle. The closed end of the casing 25 has an anchoring member 121 secured thereto which is attachable to the axle of the motor vehicle. Thus the piston of the shock absorber is secured to one relatively movable member as, for instance, the frame of the motor vehicle while the casing and the cylinder of the shock absorber, relatively movable to the piston, are attached to the axle of the vehicle.

If, for instance, the two relatively movable members move to approach each other the shock absorber is actuated so that its piston 70 moves downwardly in the cylinder 20 as regards Fig. 1. As the piston 70 moves downwardly it will exert pressure upon the fluid within the working chamber in the cylinder between the piston and the valve cage 43 thereby causing the spring carrier disc 97 to be forced downwardly a limited distance until stopped by the disc-valve 96 which is carried thereby. Fig. 2 shows the carrier 97 and its disc-valve 96 in this operated position due to fluid pressure in the lower working chamber of the cylinder. In response to this limited movement of the carrier 97 and its valve 96 the sleeve-valve 101 has been moved so that its flared portion 106 is disengaged from the annular valve-seat provided by the lower peripheral edge of the opening 49 in the valve cage. Movement of valve 101 by the carrier 97 and its valve 96 occurs against the effect of blade spring 107 yieldably to maintain said sleeve valve 101 in its normal position.

As a result of pressure being exerted by the piston upon the fluid in the lower working chamber of the cylinder this fluid will exert a pressure through the passages 73 in the piston 70 and when attaining a predetermined value will flex the disc-valve 77, backed by plate 78, from engagement with the annular valve-seats 75 and 76 against the effect of the spring 81. Now a restricted fluid flow is established from the lower working chamber of the cylinder through the piston passages 73 into the upper working chamber of the cylinder through which the piston rod 60 extends. Because of the presence of the piston rod 60 in the upper working chamber of the cylinder its fluid capacity is comparatively smaller than the capacity of the cylinder working chamber beneath the piston and therefore the upper working chamber cannot receive and retain all of the fluid discharged from the lower working chamber. The fluid displaced by the rod 60 will flow through the openings 105 in the cylinder adjacent the closure member 21, enter the annular space 23 then flow through the annular groove 51 in the valve cage 43 through the slots or openings 52 past the now open valve 101 into chamber 44 and thence via the spaces between ribs 41 in the casing into the fluid reservoir 34. The restriction offered by valve 77 to the flow of fluid through the piston passages 73 into the upper working chamber of the cylinder will cause the shock absorber to offer resistance to the approaching movements of the two relatively movable members between which it is mounted.

When the two relatively movable members separate; a reverse action of the shock absorber obtains. Now the piston 70 of the shock absorber will be moved from its position as shown in Fig. 1 upwardly in the cylinder toward the closure member 21. In response to this piston movement pressure is exerted upon the fluid within the upper working chamber of the cylinder. As pressure is exerted upon the fluid within this upper working chamber of the cylinder the same fluid pressure will be exerted through the cylinder openings 105, the annular space 23 surrounding the cylinder; and, the annular groove 51 and openings 52 in the valve cage 43. This fluid pressure will however have no effect on the balanced valve 101. The annular groove 102 in the peripheral surface of the valve 101 receives this fluid under pressure, however, the fluid acts equally in all directions on the valve 101 and due to the fact that the exposed upper and lower surfaces of said groove are of equal width, no movement thereof in response to such fluid pressure obtains.

The fluid pressure in the upper working chamber of the cylinder will, however, be exerted through the openings 80 in the disc valve 77 and its backing plate 78 through the piston passages 74 against the disc valve 86 and when attaining a predetermined value, will move said disc-valve against the effect of the loading spring 92 from engagement with the annular valve seat 85 thereby establishing a restricted fluid flow through passages 74 into the lower working chamber of the cylinder.

As has been stated before, the presence of rod 60 in the upper working cylinder chamber renders it of smaller size or fluid capacity than the lower working chamber of the cylinder and therefore as the piston moves upwardly, the fluid discharged from the upper working chamber of the cylinder through the piston passage 74 into the lower working chamber of the cylinder will not sufficiently fill this lower chamber. Therefore a subatmospheric condition will be established within the lower cylinder working chamber as the piston moves upwardly. As a result of this subatmospheric condition fluid from the reservoir 34 and its communicating space 44 beneath the valve-cage will act against the valve 96 and its carrier 97 causing them to be moved bodily upwardly against the effect of the light finger springs 100 thereby lifting valve 96 from engagement with its valve-seat 95 on the valve cage 43. Now a substantially unrestricted fluid flow from the chamber 44 and its communicating reservoir 34 into the lower working chamber of the cylinder will be established in order to compensate for the insufficiency of the fluid received from the upper working chamber of the cylinder. As soon as upward movement of the piston ceases, valve 96 will again be urged into engagement with its valve-seat 95 on the valve-cage 43 by finger springs 100 thereby shutting off communication from the lower working chamber of the cylinder and the reservoir. At the same time valve 86 will again be urged upon its seat 85 by spring 92 to shut off communication between the upper and lower working chambers of the cylinder.

Any fluid which may leak past the bearing presented by closure member 21 for the piston rod 60 will return to the reservoir 34 via the passages 33 in the closure member 21 and the annular space 30 provided between the tubes 22 and the surrounding tube 29.

Any air within the upper working chamber of the cylinder may exit therefrom through the minute grooves 35 provided in the surface of the closure member 21 engaged by the inner surface of the tube 22, this air being carried with the return of fluid leaks from passage 33 through the space 30 and will accumulate at the top of the reservoir.

From the foregoing description it may be seen that the fluid flow restricting valves adapted to establish restricted fluid flows for causing the shock absorber to offer resistance to relative movements of the members between which it is connected are supported solely by the piston acting within the cylinder and thus all controlling fluid flows are directed through the piston. The valves carried by valve cage 43 establish substantially unrestricted fluid flows which do not cause the shock absorber to offer resistance to movement.

While the embodiment of the present invention as herein disclosed, constitutes a preferred form, it is to be understood that other forms might be adopted, all coming within the scope of the claims which follow.

What is claimed is as follows:

1. An hydraulic shock absorber comprising in combination, a cylinder having a head at one end and a valve cage at the other; a rod extending through the head; a piston in the cylinder attached to the rod and having valved fluid passages; a fluid containing reservoir in communication with both ends of the cylinder; two valves in the valve cage, both yieldably urged, normally to shut off communication between the respective cylinder ends and the reservoir, one of said valves being movable by fluid pressure to establish a substantially unrestricted fluid flow from the reservoir into one end of the cylinder as the piston moves in one direction, said valve also being movable a limited distance and into tighter engagement with the valve cage as the piston moves in the opposite direction, and the second of said valves being actuated by the first valve as it moves through said limited distance, for opening communication between the other, rod containing end of the cylinder and the reservoir.

2. An hydraulic shock absorber comprising in combination, a cylinder; a fluid containing reservoir; a piston in said cylinder forming two working chambers therein, said piston having valved fluid passages; fluid passages connecting both working chambers of the cylinder with the fluid reservoir; a valve yieldably urged to prevent fluid flow from one working chamber into the reservoir but actuated by fluid pressure to establish a free flow of fluid from the reservoir into said one working chamber as the piston moves in one direction; a second valve yieldably urged, normally to prevent fluid flow through the passage connecting the other working chamber and the reservoir, said valve being immovable by fluid pressure thereon as the piston moves in said one direction, but movable by the first mentioned valve as said first valve is actuated a limited distance in response to movement of the piston in the opposite direction, for establishing a fluid flow from said other working chamber into the reservoir during said movement of the piston in said opposite direction.

3. An hydraulic shock absorber comprising in combination, a working cylinder having a head at one end and a valve cage at the other; a fluid containing reservoir connected with the cylinder through the valve cage; means connecting the reservoir with the cylinder adjacent its head; a piston rod slidably extending through the head, into the cylinder and having a piston attached thereto, said piston having valved passages providing for controlled fluid flow through the piston as it is reciprocated by the rod; a valve in the cage, normally shutting off communication between the cylinder and reservoir but operable by fluid pressure in response to movement of the piston in one direction to establish a substantially unrestricted fluid flow from the reservoir into the cylinder; and a second valve in the valve cage, normally closing the means of communication between the reservoir and cylinder portion adjacent its head, and bodily movable by the other valve in the cage as the piston is reciprocated in the other direction, for opening communication between the cylinder portion adjacent its head and the reservoir.

4. An hydraulic shock absorber comprising in combination, a working cylinder having a head at one end and a valve cage at the other; a fluid containing reservoir connected with the cylinder through the valve cage; means connecting the reservoir with the cylinder adjacent its head; a piston rod slidably extending through the head, into the cylinder and having a piston attached thereto, said piston having a plurality of valved passages for establishing controlled fluid flow through the piston in either direction in response to its reciprocation by the rod; a valve in the valve cage normally shutting off communication between the cylinder and reservoir and operative by fluid pressure to establish a substantially unrestricted flow of fluid from the reservoir into the cylinder as the piston moves toward the cylinder head; a second valve in the valve cage normally engaged by the first mentioned valve and yieldably urged normally to close the means of communication between the cylinder portion adjacent its head and the reservoir, said second valve being inoperative by fluid pressure but bodily movable by the said first mentioned valve, as it is moved by fluid pressure in the cylinder resulting from movement of the piston toward the valve cage, to open said means of communication whereby fluid displaced by the piston rod is directed to the reservoir through said means.

5. An hydraulic shock absorber comprising in combination, a cylinder provided with a head member at one end and a valve cage at the other; a fluid containing reservoir; a rod slidably extending through the head member into the cylinder; a piston secured to the rod, forming two fluid displacement chambers in the cylinder and having valved fluid flow passages for establishing controlled fluid flows from one displacement chamber into the other in response to reciprocation of the piston; a valve in the valve cage, yieldably urged to shut off communication between the one displacement chamber and the fluid reservoir; and operated by fluid pressure responsive to piston movement toward the head member, to establish a substantially unrestricted fluid flow from the reservoir into said one displacement chamber; means providing communication between the other displacement chamber and the reservoir; and a second valve in the valve cage, yieldably urged, normally to close said means, but actuated by a limited movement of the first mentioned valve in response to fluid pressure in said one displacement chamber as the piston moves toward the valve cage, to open said means and permit fluid displaced by the rod in said other displacement chamber to flow into the reservoir.

6. An hydraulic shock absorber comprising in combination, a cylinder having a head member at one end and a valve cage at the other; a larger diameter tube surrounding the cylinder and supported between the head member and valve cage and forming an annular space about the cylinder; a casing surrounding the tube and having an open end fitting about and secured to the head member and a closed end interiorly ribbed to engage the valve cage and press the cylinder and tube thereon against the head member, said casing forming a fluid containing reservoir; a central passage in the valve cage connecting the cylinder with the reservoir and transverse passages in the valve cage connecting the annular space around the cylinder with said central passage; a duct in the cylinder adjacent the head member connecting the interior of the cylinder with said annular space; a valve supported in the central passage of the valve cage yieldably urged to close the transverse passages in said cage from communication with the central passage; a second valve yieldably urged to close the central passage and to engage the first mentioned valve, said second valve being operative in one direction to open said central passage and a limited distance in the other direction to actuate said first mentioned valve to open communication of the transverse passages with the reservoir; and a rod extending through the head member, supporting a piston in the cylinder, said piston having valved passages for establishing controlled fluid flows therethrough as the piston is reciprocated by the rod.

7. An hydraulic shock absorber comprising in combination, a cylinder having closure members at each end; a piston in said cylinder, provided with a rod slidably extending through one closure member, said piston forming working chambers in the cylinder and having valve passages providing for a controlled flow of fluid through the piston from one of said working chambers into the other as the piston is reciprocated; two tubes surrounding the cylinder, the larger diameter tube forming a fluid containing reservoir in communication with a working chamber through a central opening of the other cylinder closure member, the tube immediately surrounding the cylinder providing an annular duct one end of which communicates with one working chamber adjacent the closure member supporting the piston rod and the other end with passages terminating in the central opening in said other closure member; and two valves normally urged, one to close the central opening and the other to shut off communication of the said annular duct with the reservoir, said one valve being actuated in one direction by fluid pressure as the piston moves toward the one end of the cylinder to establish a substantially unrestricted fluid flow from the reservoir into the working chamber at the other end of the cylinder, said one valve being movable a limited distance in the other direction by fluid pressure resulting from movement of the piston toward said one valve whereby said other valve is bodily moved by said one valve to open communication between the annular duct and the reservoir.

8. An hydraulic shock absorber comprising in combination a cylinder having a closure member at one end and a valve cage at the other; a piston rod slidably extending through the closure member into the cylinder; a piston in the cylinder, attached to the piston rod, said piston having valved passages; a fluid reservoir in communication with the cylinder through the valve cage; a fluid passage connecting the cylinder end adjacent the closure member with the reservoir; a valve in the valve cage normally shutting off communication between the end of the cylinder adjacent the cage and the reservoir, said valve being operable in response to piston movement toward the closure member to establish a substantially unrestricted flow of fluid from the reservoir into the cylinder; and a second valve in the valve cage, yieldably urged to shut off the reservoir, said second valve being unaffected by said fluid passage from communication with the fluid pressure but operative by a limited movement of the first mentioned valve in response to the movement of the piston toward the valve cage, to connect said fluid passage with the reservoir.

9. An hydraulic shock absorber comprising in combination, a cylinder; a rod extending into said cylinder; a piston attached to the rod and dividing the cylinder into two working chambers, said piston having valved passages providing for restricted fluid flows between said chambers; a fluid reservoir; means comprising a unitary element at one end of the cylinder providing communication between the reservoir and both working chambers of the cylinder; and two valves in said unitary element, each normally closing communication between the reservoir and a respective working chamber, one of said valves being operative in response to fluid pressure as the piston moves in one direction, for establishing fluid flow from the reservoir into the one working chamber, the other of said valves being operative in response to fluid pressure in said one working chamber, as the piston moves in the opposite direction, to connect the other working chamber with the reservoir.

10. An hydraulic shock absorber comprising in combination, a cylinder; a rod extending into said cylinder; a piston attached to the rod and dividing the cylinder into two working chambers, said piston having valved passages providing for restricted fluid flows between said chambers; a fluid reservoir; means providing communication between the reservoir and both working chambers of the cylinder; and two valves in said means, each normally closing communication between the reservoir and a respective working chamber, one of said valves being operative in response to fluid pressure as the piston moves in one direction, for establishing fluid flow from the reservoir into the one working chamber, and operative in response to fluid pressure as the piston moves in the opposite direction to actuate the other of said valves for connecting the other working chamber with the reservoir whereby fluid displaced by the rod in said other chamber is permitted to flow to the reservoir.

EDWIN F. ROSSMAN.

REFERENCES CITED

The following references are of record in the file of this patent:

UNITED STATES PATENTS

| Number | Name | Date |
| --- | --- | --- |
| 2,107,974 | Bechereau et al. | Feb. 8, 1938 |